(12) United States Patent
Kim

(10) Patent No.: US 8,669,004 B2
(45) Date of Patent: Mar. 11, 2014

(54) BATTERY PACK

(75) Inventor: Bongyoung Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 378 days.

(21) Appl. No.: 12/789,386

(22) Filed: May 27, 2010

(65) Prior Publication Data

US 2011/0003195 A1    Jan. 6, 2011

(30) Foreign Application Priority Data

Jul. 2, 2009    (KR) .................. 10-2009-0060166

(51) Int. Cl.
*H01M 2/02*    (2006.01)

(52) U.S. Cl.
USPC ............... 429/178; 429/7; 429/175; 429/179

(58) Field of Classification Search
None
See application file for complete search history.

(56) References Cited

U.S. PATENT DOCUMENTS

| | | | |
|---|---|---|---|
| 2005/0064286 A1* | 3/2005 | Kozu et al. | 429/180 |
| 2007/0046268 A1 | 3/2007 | Irie | |
| 2008/0226974 A1* | 9/2008 | Jang et al. | 429/121 |
| 2009/0098418 A1 | 4/2009 | Byun et al. | |
| 2009/0130554 A1* | 5/2009 | Jang et al. | 429/179 |

FOREIGN PATENT DOCUMENTS

| | | |
|---|---|---|
| JP | 2002-050884 | 2/2002 |
| JP | 2006-066290 | 3/2006 |
| KR | 10-2007-0026126 | 3/2007 |
| KR | 10-2009-0038153 | 4/2009 |

* cited by examiner

*Primary Examiner* — Ula C Ruddock
*Assistant Examiner* — Lisa S Park Gehrke
(74) *Attorney, Agent, or Firm* — Knobbe, Martens, Olson & Bear, LLP

(57) ABSTRACT

According to an embodiment, a battery pack includes a battery cell, a circuit module, and a cover. The circuit module is coupled to the battery cell by lead plates. Terminals are disposed on a top surface of the circuit module. The cover is coupled to the circuit module and the battery cell and exposes the terminals to an exterior environment. At least one support plate is disposed between the circuit module and the battery cell. Thus, the support plate prevents the circuit module of the battery pack from being bent.

19 Claims, 6 Drawing Sheets

US 8,669,004 B2

BATTERY PACK

CROSS-REFERENCE TO RELATED APPLICATIONS

This application claims priority to and the benefit of Korean Patent Application No. 10-2009-0060166, filed on Jul. 2, 2009, the disclosure of which is incorporated herein by reference in its entirety.

BACKGROUND

1. Field

Embodiments relate to a battery pack.

2. Description of the Related Technology

Generally, as portable wireless devices, such as video cameras, mobile phones, and portable computers, are being made more lightweight and highly functionalized, secondary batteries used for their driving power sources are being actively developed. For example, such secondary batteries can include nickel-cadmium batteries, nickel-hydrogen batteries, nickel-zinc batteries, and lithium ion batteries. Among these, lithium ion secondary batteries may be rechargeable, miniaturized, and have maximized capacity. Thus, lithium ion secondary batteries are widely used in high tech electronic device fields because they have high operating voltage and high energy density per unit weight.

The lithium ion secondary batteries may be manufactured in a battery pack configuration. A battery pack may include a battery cell, a circuit module, and a cover. The battery cell may include an electrode assembly, including a positive electrode plate, a negative electrode plate and a separator, a can receiving the electrode assembly, and a cap assembly sealing the can. The circuit module may include a protective circuit module (PCM) and be coupled to the battery cell, and the cover may cover the circuit module.

SUMMARY

According to an embodiment, a battery pack includes a battery cell, a circuit module on which terminals are disposed on a top surface thereof, the circuit module being fixed to the battery cell using lead plates, and a cover coupled to the circuit module and the battery cell, the cover exposing the terminals to the outside, wherein at least one support plate is disposed between the circuit module and the battery cell.

DETAILED DESCRIPTION OF THE PREFERRED EMBODIMENT

Embodiments of the present invention will be described in more detail with reference to the accompanying drawings.

Figure 1A:
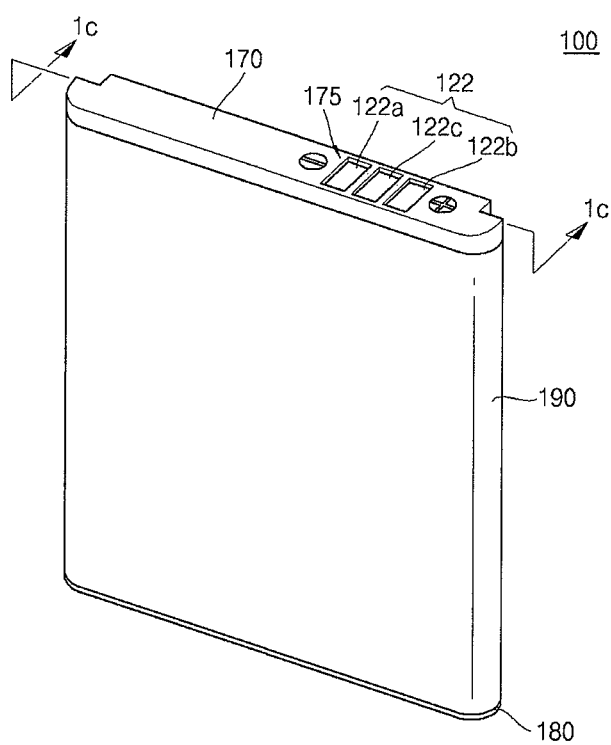
FIGS. 1A and 1B respectively illustrate a perspective view and an exploded perspective view of a battery pack according to an embodiment.
Figure 1B:
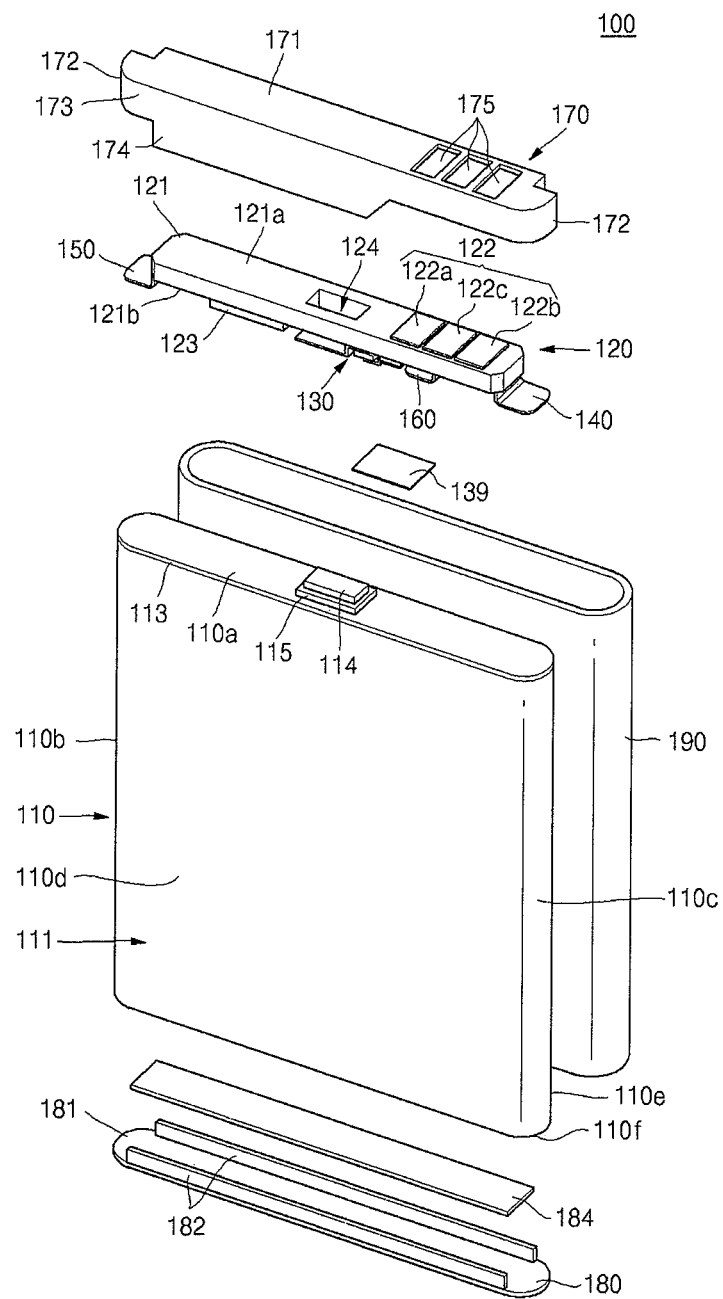
Figure 1C:
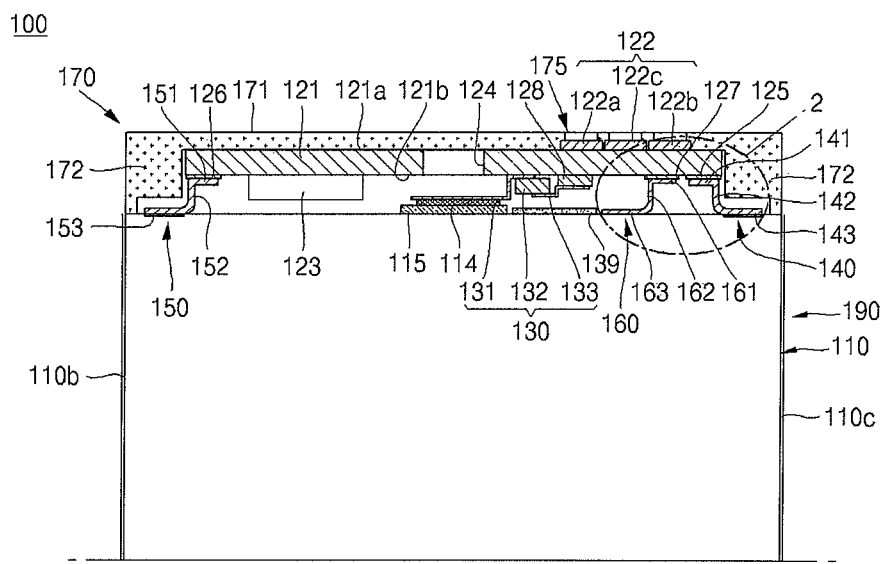
FIG. 1C illustrates a sectional view taken along line 1c-1c of FIG. 1.

FIGS. 1A and 1B respectively illustrate a perspective view and an exploded perspective view of a battery pack according to an embodiment, and FIG. 1C illustrates a sectional view taken along line 1c-1c of FIG. 1.

Referring to FIGS. 1A to 1C, a battery pack 100 according to an embodiment includes a battery cell 110, a circuit module 120, a positive temperature coefficient (PTC) assembly 130, a first lead plate 140, a second lead plate 150, a support plate 160, a top cover 170, a bottom cover 180, and a label 190.

The battery cell 110 may include an electrode assembly (not shown), a can 111, and a cap plate 113. The electrode assembly may be chargeable and dischargeable. The electrode assembly may include a positive electrode plate, a negative electrode plate, and a separator disposed between the positive electrode plate and the negative electrode plate. The can 111 may receive the electrode assembly and electrolyte (not shown). The cap plate 113 may seal the can 111. Here, an electrode terminal 114 may be coupled to an approximately central portion of the cap plate 113. An insulating gasket 115 may be disposed between the cap plate 113 and the electrode terminal 114.

For example, the can 111 and the cap plate 113 may serve as a positive terminal. Also, the electrode terminal 114 may serve as a negative terminal. Alternatively, the can 111 and the cap plate 113 may serve as the negative terminal, and the electrode terminal 114 may serve as the positive terminal.

The battery cell 110 may have a top surface 110a, a pair of short side surfaces 110b and 110c, a pair of long side surfaces 110d and 110e, and a bottom surface 110f. The pair of short side surfaces 110b and 110c and the pair of long side surfaces 110d and 110e may be connected to the top surface 110a. The bottom surface 110f may be connected to the side surfaces 110b, 110c, 110d, and 110e and face the top surface 110a. Here, the pair of short side surfaces 110b and 110c denotes surfaces having a relatively narrow width among the side surfaces 110b, 110c, 110d, and 110e connected to the top surface 110a of the battery cell 110. The pair of long side surfaces 110d and 110e denotes surfaces having a relatively wide width among the side surfaces 110b, 110c, 110d, and 110e of the battery cell 110.

The circuit module 120 may be disposed on an upper portion of the battery cell 110 and be electrically connected to the battery cell 110. The circuit module 120 may include a circuit board 121, terminals 122, a circuit device 123, a hole 124 for welding, and terminal patterns 125, 126, 127, and 128.

The circuit board 121 may approximately have a plate shape. The circuit board 121 may include a protective circuit for protecting the battery cell 110 from overcharge, overdischarge, and overcurrent. Here, a top surface 121a of the circuit board 121 is equal to that of the circuit module 120, and a bottom surface 121b of the circuit board 121 is equal to that of the circuit module 120.

The terminals 122 may be disposed on the top surface 121a of the circuit board 121 and electrically connect the circuit board 121 to an external electric device (not shown). For example, the respective terminals 122 may include a pack minus terminal 122a, a pack plus terminal 122b, and a temperature and identification (ID) terminal 122c.

The circuit device 123 may be disposed on the bottom surface 121b of the circuit board 121. The circuit device 123 may constitute the protective circuit for protecting the battery cell 110 from the overcharge, the overdischarge, and the overcurrent. Alternatively, the circuit device 123 may be disposed on the top surface 121a of the circuit board 121.

The hole 124 for welding may be formed in an approximately central portion of the circuit board 121 and pass through the top surface 121a and the bottom surface 121b of the circuit board 121. Particularly, the hole 124 for welding may be formed in a region corresponding to the electrode terminal 114 of the battery cell 110 and be used as a welding space when the PTC assembly 130 is welded to the electrode terminal 114.

The terminal patterns 125, 126, 127, and 128 may be disposed on the bottom surface 121b of the circuit board 121. The first lead plate 140 may be welded to the terminal pattern 125. The second lead plate 150 may be welded to the terminal pattern 126. The support plate 160 may be welded to the terminal pattern 127. The PTC assembly 130 may be welded to the terminal pattern 128. The terminal patterns 125, 126, and 127 may be directly electrically connected to the pack plus terminal 122b or electrically connected to the pack plus terminal 122b via the circuit device 123. Also, the terminal pattern 128 may be directly electrically connected to the pack minus terminal 122a or electrically connected to the pack minus terminal 122a via the circuit device 123.

The PTC assembly 130 may be disposed on the bottom surface 121b of the circuit board 121 and electrically connected to the terminal pattern 128 of the circuit module 120. Also, the PTC assembly 130 may be electrically connected to the electrode terminal 114 by resistance or laser welding through the hole 124 for welding. In detail, the PTC assembly 130 may include an electrode lead plate 131, a PTC device 132, and a connection lead plate 133. Here, the electrode lead plate 131 is directly welded to the electrode terminal 114. For example, the electrode lead plate 131 may be formed of nickel or nickel alloy. The PTC device 132 may be connected to the electrode lead plate 131. When the battery cell 110 increases in temperature, resistance can increase to reduce the output current of the battery cell 110. The connection lead plate 133 may be connected to the PTC device 132. Moreover, the connection lead plate 133 may be welded to the terminal pattern 128 disposed on the circuit board 121. For example, the connection lead plate 133 may be formed of nickel or nickel alloy. An insulating sheet 139 may be disposed between the PTC assembly 130 and the battery cell 110 to prevent the PTC assembly 130 from electrically short-circuiting the cap plate 113.

The first lead plate 140 may be coupled to one side (a right side when referring to FIGS. 1B and 1C) of the circuit module 120 and electrically connected to the terminal pattern 125 of the circuit module 120. That is, the first lead plate 140 may electrically connect the battery cell 110 to the circuit module 120. For example, the first lead plate 140 may be formed of a metallic material such as nickel or nickel alloy. Here, the first lead plate 140 is connected to the top surface (i.e., the cap plate 113) of the battery cell 110 to serve as the positive electrode.

The first lead plate 140 may include a first lead bottom part 141, a first lead sidewall part 142, and a first lead extension part 143.

The first lead bottom part 141 may have a plate shape and be welded to the terminal pattern 125 disposed on the circuit board 121.

The first lead sidewall part 142 may be bent downward from the first lead bottom part 141 to extend toward the top surface 110a of the battery cell 110. As a result, the first lead sidewall part 142 may secure a space between the circuit module 120 and the battery cell 110.

The first lead extension part 143 may be bent and extend outwardly from the first lead sidewall part 142 to contact the top surface 110a of the battery cell 110. As a result, the first lead extension part 143 may be approximately parallel to the first lead bottom part 141. The first lead extension part 143 may be electrically connected to the top surface 110a of the battery cell 110 by resistance or laser welding. Moreover, a surface of the first lead extension part 143 may be additionally coated with silicon to improve dropping impact resistance of the battery pack.

The second lead plate 150 may be coupled to the other side (a left side when referring to FIGS. 1B and 1C) of the circuit module 120. That is, the second lead plate 150 may be electrically connected to the terminal pattern 126 of the circuit module 120. Here, the terminal pattern 126 may be electrically connected to the pack plus terminal 122b through a positive interconnection pattern (not shown) of the circuit module 120. Alternatively, the second lead plate 150 may not be electrically connected to the positive interconnection pattern of the circuit module 120.

The second lead plate 150 may have the same configuration and size as the first lead plate 140 and be formed of the same material as the first lead plate 140. The second lead plate 150 may include a second lead bottom part 151, a second lead sidewall part 152, and a second lead extension part 153. The second lead bottom part 151, the second lead sidewall part 152, and the second lead extension part 153 of the second lead plate 150 may correspond to the first lead bottom part 141, the first lead sidewall part 142, and the first lead extension part 143 of the first lead plate 140, respectively.

The second lead plate 150 including the above-described components may be disposed on the upper portion of the battery cell 110 together with the first lead plate 140 to maintain the circuit module 120 in a horizontal state.

At least one support plate 160 may be disposed between the battery cell 110 and the circuit module 120. That is, at least one support plate 160 may be disposed between the first lead plate 140 and the second lead plate 150. In detail, the support plate 160 may be welded to the circuit module 120 and may closely adhere to the battery cell 110. Alternatively, the support plate 160 may closely adhere to the circuit module 120 and be welded to the battery cell 110. Moreover, the support plate 160 may elastically adhere to the battery cell 110. Also, the support plate 160 may elastically adhere to the circuit module 120.

The support plate 160 may have a first section 161 welded or elastically adhered to the circuit module 120, a second section 162 bent downward from the first section 161, and a third section 163 bent from the second section 162 and elastically adhering or welded to the battery cell 110.

At least one support plate 160 may be further disposed on the circuit module 120 to prevent the circuit module 120 from being bent by an external force during or after a battery pack manufacturing process.

The support plate 160 may be electrically connected to the pack plus terminal 122b through the terminal pattern 127 of the circuit module 120. The circuit device 123, the interconnection pattern, and a via hole may be disposed between the terminal pattern 127 and the pack plus terminal 122b. Moreover, the first lead plate 140 may be electrically connected to the pack plus terminal 122b through the terminal pattern 125. Thus, the support plate 160 and the first lead plate 140 may be electrically connected to each other. As a result, an electrical path may be sufficiently secured between the battery cell 110 and the circuit module 120. In some cases, the support plate 160 may not be electrically connected to the pack plus terminal 122b of the circuit module 120.

The top cover 170 may be coupled to the upper portion of the battery cell 110 to receive the circuit module 120. The top cover 170 may include a cover plate 171 and sidewalls 172 and 173 extending from the cover plate 171 toward the circuit module 120.

The cover plate 171 may have a shape approximately similar to that of the top surface 110a of the battery cell 110. An inner surface of the cover plate 171 may contact the top surface 121a of the circuit board 121. Through holes 175 may be formed in a region of the cover plate 171 corresponding to the terminals 122. The terminals 122 may be exposed through the through holes 175 to the outside, and the battery pack 100 may be electrically connected to an external electric device (not shown) through the through holes 175.

The sidewalls 172 and 173 may include sidewalls 172 disposed on both ends of a longitudinal direction of the top cover 170 and sidewalls 173 connecting the sidewalls 172 to each other. The sidewalls 172 may contact regions corresponding to the short side surfaces 110b and 110c of the top surface 110a of the battery cell 110 to support the cover plate 171. The sidewalls 173 may contact regions corresponding to the long side surfaces 110d and 110e of the top surface 110a of the battery cell 110 to support the cover plate 171. An extension part 174 may further extend from the sidewalls 173 toward the battery cell 110. The extension part 174 may cover portions of the pair of long side surfaces 110d and 110e of the battery cell 110 and surround the label 190.

The bottom cover 180 may be coupled to a lower portion of the battery cell 110. The bottom cover 180 may include a bottom plate 181 and extension parts 182 extending from the bottom plate 181 toward the battery cell 110.

The bottom plate 181 may have a shape approximately equal to that of the bottom surface 110f of the battery cell 110 and may adhere to the bottom surface 110f of the battery cell 110 by an adhesive sheet 184.

The extension parts 182 may cover lower portions of the long side surfaces 110d and 110e of the battery cell 110. The extension parts 182 may be surrounded by the label 190.

The label 190 may surrounding and attach to the side surfaces 110b, 110c, 110d, and 110e of the battery cell 110. The label 190 may cover a portion of the extension part 174 and the extension parts 182 of the bottom cover 180.

Here, the bottom cover 180, the adhesive sheet 184, and the label 190 may be omitted as necessary, and are not necessary for this embodiment.

Figure 2:
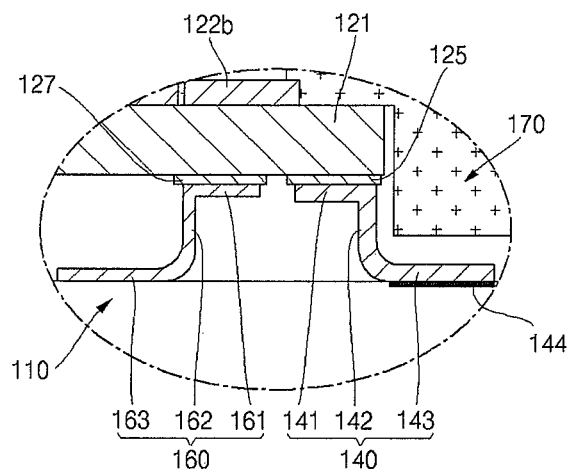
FIG. 2 illustrates an enlarged view of a second section of FIG. 1C.

FIG. 2 illustrates an enlarged view of a second section of FIG. 1C.

Referring to FIG. 2, the first lead extension part 143 of the first lead plate 140 may be welded to the battery cell 110 using resistance or laser welding. That is, the first lead plate 140 may be completely fixed to the battery cell 110 through a welded part 144. However, the third section 163 of the support plate 160 may closely adhere to or contact the battery cell 110. That is, the third section 163 of the support plate 160 may not be welded to the battery cell 110, but may elastically adhere to or contact the battery cell. In this case, the support plate 160 may be welded to the terminal pattern 127 using resistance or laser welding. In some cases, the third section 163 of the support plate 160 may be welded to the battery cell 110. Also, in some cases, the third section 163 of the support plate 160 may be welded to the battery cell 110, and the first section 161 may elastically adhere to or contact the circuit module 120.

Figure 3:
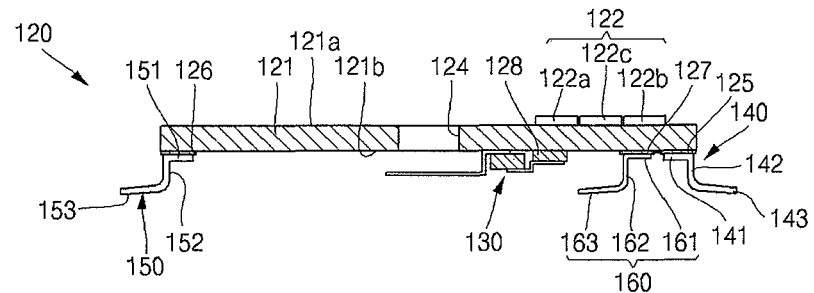
FIG. 3 illustrates a sectional view of a circuit module of a battery pack according to an embodiment.

FIG. 3 illustrates a sectional view of a circuit module of a battery pack according to an embodiment.

Referring to FIG. 3, a support plate 160 provided in a circuit module 120 may be welded to a bottom surface 121b of a circuit board 121 corresponding to terminals 122a, 122b, and 122c. That is, a terminal pattern 127 may be disposed on the bottom surface 121b of the circuit board 121 corresponding to the terminals 122a, 122b, and 122c. The support plate 160 may be welded to the terminal pattern 127. Here, since the terminal pattern 127 has a width similar to that of one of the terminals 122a, 122b, and 122c, the terminal pattern 127 may be disposed in a region corresponding to any one of the terminals 122a, 122b, and 122c.

The support plate 160 may have a first section 161 welded to the first pattern 127, a second section 162 bent downward from an end of the inside (a region closer to a center of a PTC assembly 130 or the circuit module 120) of the first section 161, and a third section 163 bent from the second section 162 toward the inside (a central direction of the PTC assembly 130 or the circuit module 120) of the circuit board 121. Here, the third section 163 is not horizontally disposed, but is slightly inclined downward with respect to a horizontal plane. Thus, the third section 163 may elastically adhere to or contact a battery cell.

Moreover, the support plate 160 may have a thickness approximately less than that of a first lead plate 140 or a second lead plate 150. Thus, the support plate 160 may have an elastic force relatively less than that of the first lead plate 140 or the second lead plate 150. As a result, the elastic force of the support plate 160 does not interfere with welding of the first lead plate 140 or the second lead plate 150. That is, when the first lead plate 140 or the second lead plate 150 is welded to the battery cell, the support plate 160 does not push the first lead plate 140 or the second lead plate 150 from the battery cell toward the outside.

Figure 4:
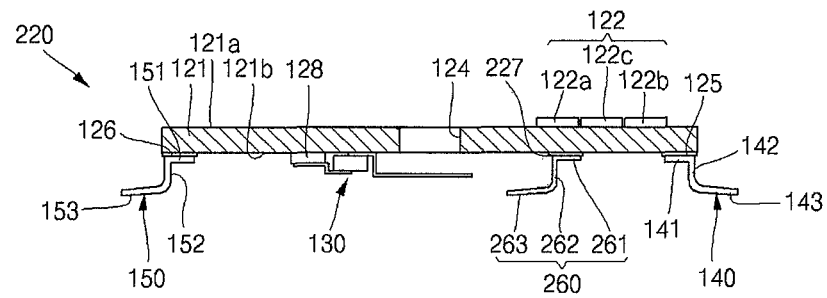
FIG. 4 illustrates a sectional view of a circuit module of a battery pack according to another embodiment.

FIG. 4 illustrates a sectional view of a circuit module of a battery pack according to another embodiment.

Referring to FIG. 4, a support plate 260 provided in a circuit module 220 may be welded to a bottom surface 121b of the circuit board 121 corresponding to one of terminals 122a, 122b, and 122c, e.g., the terminal 122a (plus pack terminal). That is, a terminal pattern 227 may be disposed on the bottom surface 121b of the circuit board 121 corresponding to the pack minus terminal 122a, and the support plate 260 may be welded to the terminal pattern 227. The support plate 260 may have a first section 261, a second section 262, and a third section 263. Specifically, the second section 262 may be formed below the circuit board 121 corresponding to the pack minus terminal 122a.

A bending degree of the circuit board 121 may increase as a distance increases away from the first lead plate 140. Specifically, since an external force may be directly applied to the terminals 122a, 122b, and 122c, a bending degree of the region corresponding to the pack minus terminal 122a that is nearest to the first lead plate 140 can be greatest. Thus, the terminal pattern 227 may be disposed on the bottom surface 121b of the circuit board 121 corresponding to the pack minus terminal 122a, and the first section 261 of the support plate 260 may be welded to the terminal pattern 227. Also, the second section 262 of the support plate 260 may be disposed below the circuit board 121 corresponding to the pack minus terminal 122a. In addition, the third section 263 of the support plate 260 may be disposed below the circuit board 121 corresponding to the pack minus terminal 122a. Here, the third section 263 may closely adhere to a battery cell during a process of manufacturing a battery pack.

As described above, since the support plate 260 may be disposed on the bottom surface 121b of the circuit board 121 corresponding to the pack minus terminal 122a, which is nearest to the first lead plate 140 of the terminals 122a, 122b, and 122c, it may efficiently prevent the circuit board 121 from being bent.

Figure 5:
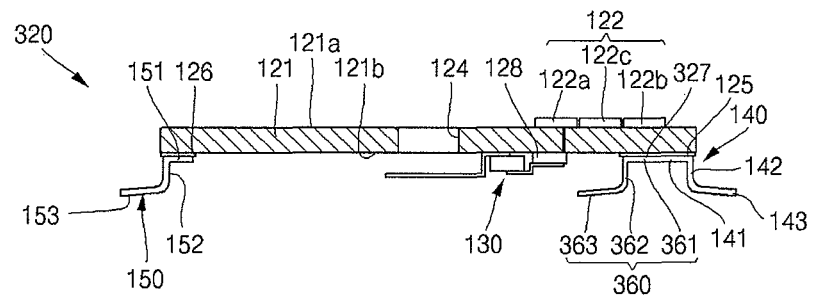
FIG. 5 illustrates a sectional view of a circuit module of a battery pack according to another embodiment.

FIG. 5 illustrates a sectional view of a circuit module of a battery pack according to another embodiment.

Referring to FIG. 5, a support plate 360 provided in a circuit module 320 may be integrally formed with a first lead plate 140. That is, the first lead plate 140 may include a first lead bottom part 141, a first lead sidewall part 142, and a first lead extension part 143. A first section 361 of the support plate 360 may be connected to the first lead bottom part 141. A second section 362 may be connected to the first section 361 in a state where the second section 362 is bent. A third section 363 may be connected to the second section 362 in a state where the third section 363 is bent. Accordingly, the support plate 360 may be integrally formed with terminal patterns 327 and 125 to which the first lead plate 140 may be welded.

As described above, since the support plate 360 may be integrally formed with the first lead plate 140, the support plate 360 and the first lead plate 140 may be welded to a circuit board 121 at the same time. Thus, a process of manufacturing the circuit module 320 may be simplified.

Figure 6:
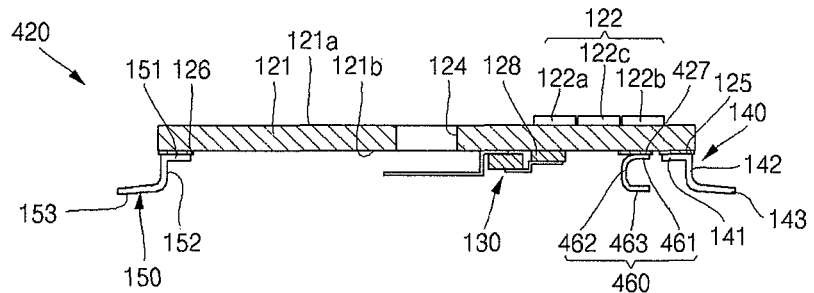
FIG. 6 illustrates a sectional view of a circuit module of a battery pack according to another embodiment.

FIG. 6 illustrates a sectional view of a circuit module of a battery pack according to another embodiment.

Referring to FIG. 6, a support plate 460 provided in a circuit module 420 may have an approximate "⊂" shape. That is, the support plate 460 may have a first section 461 welded to a terminal pattern 427, a second section 462 bent from an end of the inside of the first section 461 (in a direction toward a PTC assembly 130), and a third section 463 bent from the second section 462 toward the outside of a circuit board 121. Here, the first section 461 has the same length as the third section 463.

As described above, since the support plate 460 may be welded to the circuit board 121, it may prevent the circuit board 121 from being bent.

Figure 7:
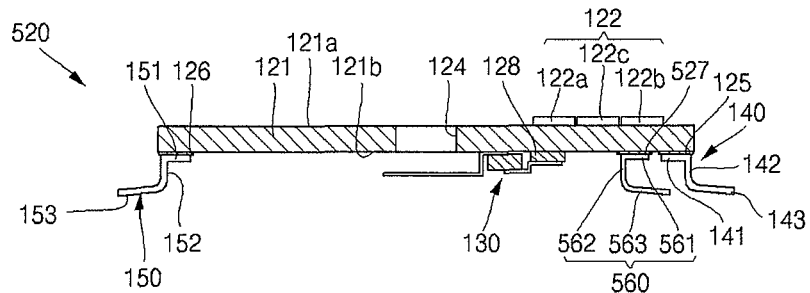
FIG. 7 illustrates a sectional view of a circuit module of a battery pack according to another embodiment.

FIG. 7 illustrates a sectional view of a circuit module of a battery pack according to another embodiment.

Referring to FIG. 7, a support plate 560 provided in a circuit board 520 may have an approximate "⊂" shape. However, a third section 563 of the support plate 560 may have a length greater than that of a first section 561. Moreover, the third section 563 may be inclined downwardly. Thus, the third section 563 of the support plate 560 may elastically adhere to a battery cell.

Figure 8:
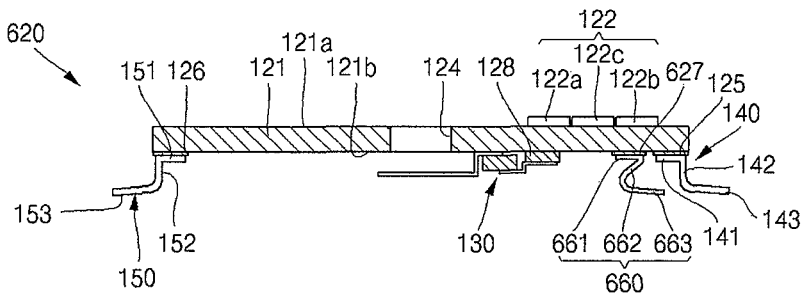
FIG. 8 illustrates a sectional view of a circuit module of a battery pack according to another embodiment.

FIG. 8 illustrates a sectional view of a circuit module of a battery pack according to another embodiment.

Referring to FIG. 8, a support plate 660 provided in a circuit module 620 may have an approximate "Z" shape. That is, the support plate 660 may have a first section 661 welded to a terminal pattern 627, a second section 662 bent from an end of the outside of the first section 661 toward the inside (in a direction toward a PTC assembly 130) of the circuit module 620, and a third section 663 bent from the second section 662 toward the outside of the circuit module 620. Here, the third section of the support plate 660 may be inclined downwardly. Thus, the third section 663 of the support plate 660 may elastically adhere to a battery cell.

Moreover, since the support plate 660 may have the approximate "Z" shape, elastic force may further increase. Thus, it may efficiently prevent the circuit module 620 from being bent.

Figure 9A:
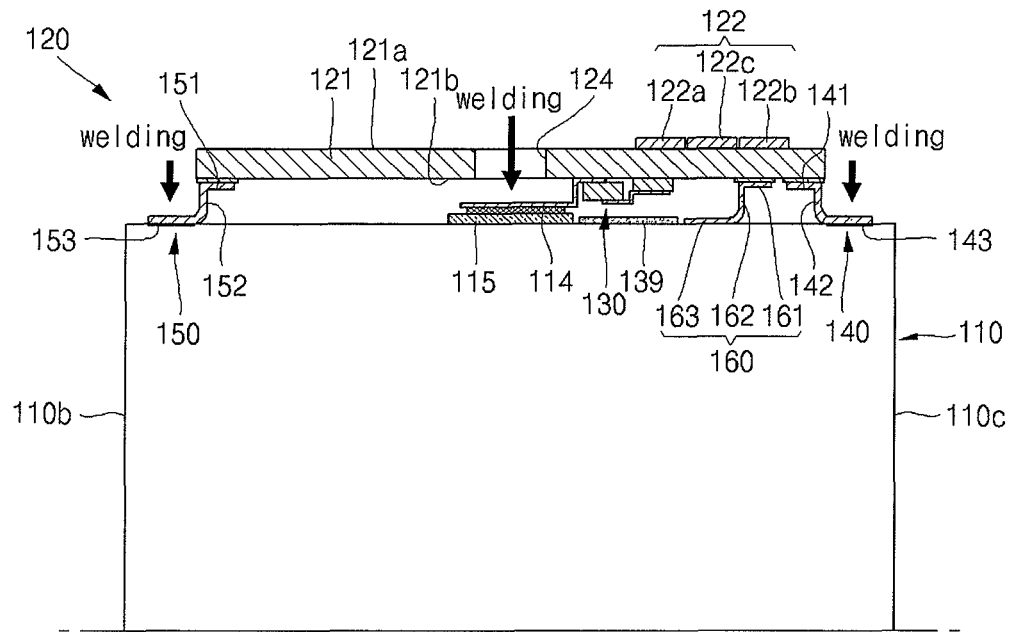
FIGS. 9A to 9C illustrate sectional views of a process of manufacturing a battery pack according to another embodiment.
Figure 9B:
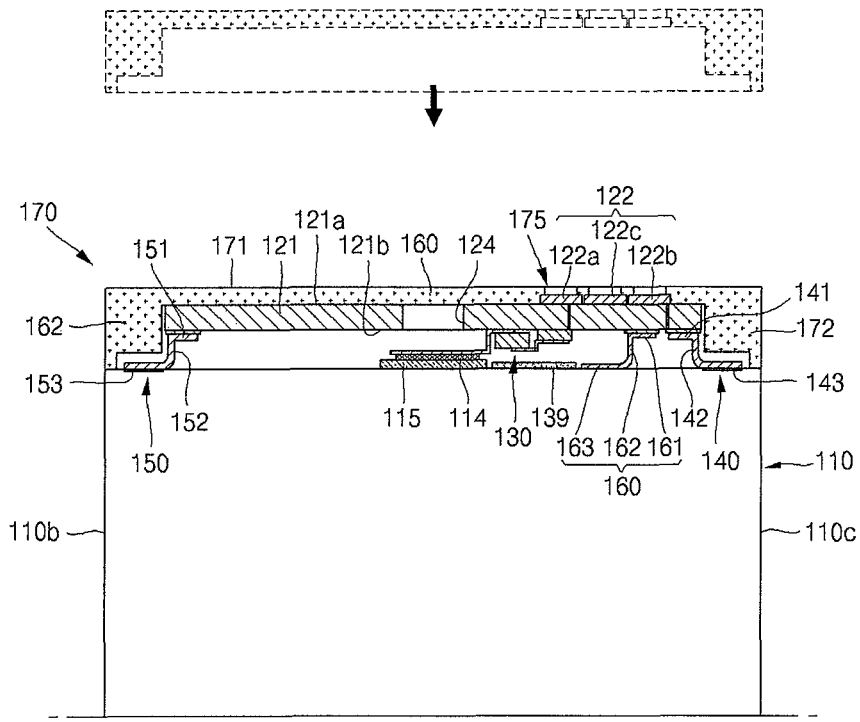
Figure 9C:
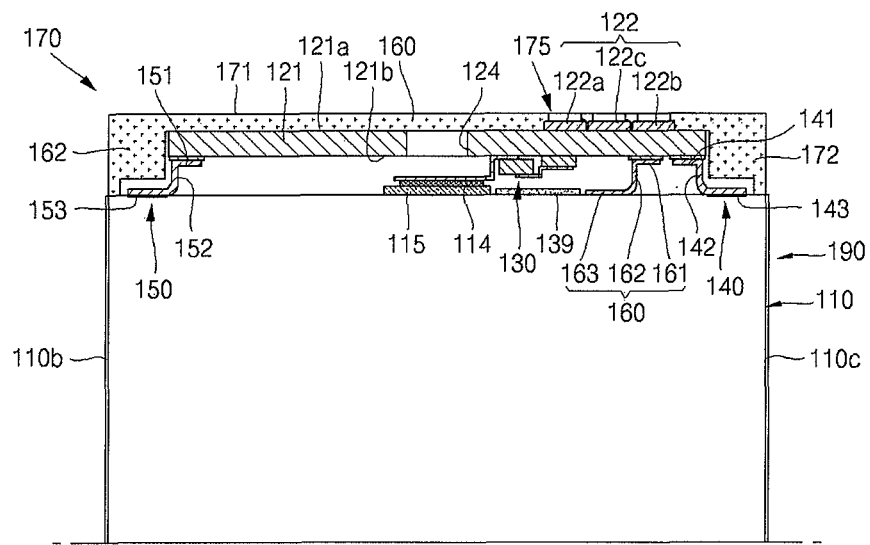

FIGS. 9A to 9C illustrate sectional views of a process of manufacturing a battery pack according to another embodiment.

Referring to FIG. 9A, a circuit module 120 may closely adhere to a top surface of a battery cell 110. That is, a PTC assembly 130 of the circuit module 120 may contact an electrode terminal 114 provided in the battery cell 110. A first lead plate 140 and a second lead plate 150 of the circuit module 120 may contact both ends of the top surface of the battery cell 110, respectively. Also, the support plate 160 provided in the circuit module 120 may elastically adhere to the top surface of the battery cell 110. Thus, the support plate 160 may prevent regions corresponding to terminals 122a, 122b, and 122c of the circuit module 120 from being bent.

An electrode lead plate 131 of the PTC assembly 130 may be welded to an electrode terminal 114 using resistance or laser welding. Here, a welding tool may pass through a hole 124 for welding, which is formed in the circuit module 120. The first lead plate 140 and the second lead plate 150 may be welded to both ends of the top surface of the battery cell 110 using resistance or laser welding, respectively.

Referring to FIG. 9B, a top cover 170 may be inserted into the circuit module 120. That is, a top surface and side surfaces of the circuit module 120 may be completely covered by the top cover 170. Also, a portion of the top surface of the battery cell may be covered by the top cover 170. A plurality of through holes 175 may be previously formed in the top cover 170 to expose terminals 122a, 122b, and 122c disposed on the circuit module 120 to the outside. In addition, a bottom cover (not shown) may be coupled to a lower end of the battery cell 110 to absorb an external impact.

Referring to FIG. 9C, a label 190 may cover side surfaces of the battery cell 110. Here, a portion of the top cover 170 and a portion of the bottom cover may also be covered by the label 190. The label 190 may prevent the top cover 170 and the bottom cover from being separated from the battery cell 110.

With the above described methods, a battery pack according to an embodiment can be manufactured. As described above, since the support plate 160 closely adhering to the battery cell 110 may be disposed on a bottom surface 121b of the circuit module 120, it can prevent the circuit module 120 from being bent by an external force during or after a battery pack manufacturing process. Although one support plate 160 is illustrated in the above-described drawings, a plurality of support plates 160 may be provided.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack comprising:
   a battery cell;
   a circuit module comprising a top surface, wherein the circuit module is coupled to the battery cell by lead plates;
   terminals disposed on the top surface of the circuit module; and
   a cover coupled to the circuit module and the battery cell, wherein the cover exposes the terminals to an external environment;
   wherein at least one support plate is disposed between the circuit module and the battery cell, wherein the at least one support plate has an elastic force less than the elastic force of the lead plates and wherein the at least one support plate is disposed between the lead plates and wherein the at least one support plate is disposed in a region corresponding to the terminals and wherein the at least one support plate has a first portion having a first and second end that extends in a first direction that is attached to the circuit module, a second portion having a first and second end that is attached to a first end of the first portion and extends in a second direction substantially perpendicular to the first direction and a third portion that is attached to the bare cell and has a first end that is connected to the second end of the second portion wherein the third portion extends in a third direction that is substantially perpendicular to the second direction.

2. The battery pack as claimed in claim 1, wherein the at least one support plate is welded to the circuit module.

3. The battery pack as claimed in claim 1, wherein the at least one support plate adheres to the battery cell.

4. The battery pack as claimed in claim 1, wherein the at least one support plate elastically adheres to the battery cell.

5. The battery pack as claimed in claim 1, wherein the at least one support plate has a thickness less than thicknesses of the lead plates.

6. The battery pack as claimed in claim 1, wherein the at least one support plate is welded to a bottom surface of the circuit module.

7. The battery pack as claimed in claim 1, wherein the at least one support plate is integrally formed with at least one of the lead plates.

8. The battery pack as claimed in claim 1, wherein the at least one support plate is electrically connected to at least one of the lead plates.

9. The battery pack as claimed in claim 1, wherein the at least one support plate comprises:
 a first section welded to the circuit module;
 a second section bent from the first section; and
 a third section bent from the second section, the third section adhering to the battery cell.

10. The battery pack as claimed in claim 9, wherein the at least one support plate is welded to a bottom surface of the circuit module.

11. The battery pack as claimed in claim 9, wherein the second section of the at least one support plate is disposed below the circuit module.

12. The battery pack as claimed in claim 9, wherein the third section of the at least one support plate is disposed below the circuit module.

13. The battery pack as claimed in claim 9, wherein the second section of the at least one support plate is disposed in a region corresponding to the terminal nearest to a center of the circuit module.

14. The battery pack as claimed in claim 1, wherein the at least one support plate comprises:
 a first section welded to the circuit module;
 a second section bent from an inner end of the first section; and
 a third section bent from the second section toward an interior side of the circuit module.

15. The battery pack as claimed in claim 1, wherein the at least one support plate comprises:
 a first section welded to the circuit module;
 a second section bent from an inner end of the first section; and
 a third section bent from the second section toward an exterior side of the circuit module.

16. The battery pack as claimed in claim 1, wherein the at least one support plate comprises:
 a first section welded to the circuit module;
 a second section bent from an outer end of the first section toward an interior side of the circuit module; and
 a third section bent from the second section toward an exterior side of the circuit module.

17. A battery pack comprising:
 a battery cell having a first surface;
 a circuit module positioned adjacent the first surface of the battery cell wherein the circuit module is coupled to the battery cell via at least one leads and has terminals thereon;
 a cover that is positioned over the circuit module and exposes the terminals to an external environment; and
 at least one support member that is disposed between the circuit module and the first surface of the battery cell so as to inhibit the circuit module from being bent by an external force and wherein the at least one support plate has an elastic force less than the elastic force of the at least one leads wherein the support plate is disposed between the lead plates and wherein the support plate is disposed in a region corresponding to the terminals and wherein the at least one support member has a first portion having a first and second end that extends in a first direction that is attached to the circuit module, a second portion having a first and second end that is attached to a first end of the first portion and extends in a second direction substantially perpendicular to the first direction and a third portion that is attached to the bare cell and has a first end that is connected to the second end of the second portion wherein the third portion extends in a third direction that is substantially perpendicular to the second direction.

18. The battery pack as claimed in claim 17, wherein the at least one support member adheres to the battery cell.

19. The battery pack as claimed in claim 17, wherein the at least one support member is electrically connected to the leads.

* * * * *